(12) United States Patent  (10) Patent No.: US 7,461,935 B2
Collier et al.  (45) Date of Patent: Dec. 9, 2008

(54) EYEWEAR WITH INNER AND OUTER FRAME LENS

(75) Inventors: Michael Collier, Beaverton, OR (US); Kyle Schepke, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 272 days.

(21) Appl. No.: 11/380,295

(22) Filed: Apr. 26, 2006

(65) Prior Publication Data
US 2007/0252942 A1  Nov. 1, 2007

(51) Int. Cl.
*G02C 5/11* (2006.01)
(52) U.S. Cl. .......................... 351/47; 351/57
(58) Field of Classification Search .......... 357/47, 357/57; 351/47, 57, 41
See application file for complete search history.

(56) References Cited

U.S. PATENT DOCUMENTS

| | | |
|---|---|---|
| 2,362,725 A | 11/1944 | Slotsky |
| 2,397,243 A | 3/1946 | Cooper, Jr. |
| 2,444,498 A | 7/1948 | Cochran |
| D150,924 S | 9/1948 | Bright |
| 2,534,655 A | 12/1950 | Baratelli |
| 2,563,125 A | 8/1951 | Malcom, Jr. |
| 2,571,704 A | 10/1951 | Gilden |
| 2,607,919 A | 8/1952 | Stegeman |
| 2,770,806 A | 11/1956 | Moeller |
| 2,825,267 A | 3/1958 | Gagnon |
| D182,459 S | 4/1958 | Eisler |
| 3,066,573 A | 12/1962 | Moeller |
| 3,233,429 A | 2/1966 | Baratelli et al. |
| 3,453,042 A | 7/1969 | Cooper |
| 3,517,393 A | 6/1970 | Beauchef |
| 3,756,704 A | 9/1973 | Marks |
| 3,838,914 A | 10/1974 | Fernandez |
| 4,317,240 A | 3/1982 | Angerman et al. |
| 4,674,851 A | 6/1987 | Jannard |
| D293,450 S | 12/1987 | Jannard |
| 4,730,915 A | 3/1988 | Jannard |
| 4,810,080 A | 3/1989 | Grendol et al. |
| 4,824,233 A | 4/1989 | Jannard |
| 4,951,322 A * | 8/1990 | Lin ............................. 2/439 |
| 5,007,727 A * | 4/1991 | Kahaney et al. ............ 351/47 |
| D324,394 S | 3/1992 | Jannard |

(Continued)

FOREIGN PATENT DOCUMENTS

IT  01279258  12/1997

(Continued)

OTHER PUBLICATIONS

Adidas, Twini, product promotion literature, dated at least as early as Mar. 1997.

(Continued)

*Primary Examiner*—Hung X Dang
*Assistant Examiner*—Vipin M Patel
(74) *Attorney, Agent, or Firm*—Banner & Witcoff, Ltd.

(57) ABSTRACT

Eyewear includes an outer frame having a right temple arm and a left temple arm. An outer lens is secured to the outer frame. An inner frame is removably secured to the outer frame. An inner lens is positioned in the inner frame. A portion of the outer lens engages the inner frame to removably secure the inner frame to the outer frame.

26 Claims, 6 Drawing Sheets

U.S. PATENT DOCUMENTS

| | | | |
|---|---|---|---|
| 5,249,001 | A | 9/1993 | Jannard |
| 5,387,949 | A | 2/1995 | Tackles |
| 5,467,148 | A | 11/1995 | Conway |
| 5,555,037 | A | 9/1996 | Canavan |
| 5,576,775 | A | 11/1996 | Bolle |
| 5,581,312 | A | 12/1996 | Chen |
| 5,760,868 | A | 6/1998 | Jannard et al. |
| 5,790,230 | A | 8/1998 | Sved |
| 5,841,505 | A | 11/1998 | Bolle |
| 5,969,787 | A | 10/1999 | Hall et al. |
| 6,086,199 | A | 7/2000 | Holland et al. |
| 6,116,731 | A | 9/2000 | Fuchs |
| 6,196,681 | B1 | 3/2001 | Canavan |
| 6,367,927 | B2 | 4/2002 | Yang |
| 6,386,703 | B1 | 5/2002 | Huang |
| 6,386,705 | B1 | 5/2002 | Chen |
| 6,517,202 | B2 | 2/2003 | Huang |
| 6,783,235 | B1 | 8/2004 | Lin |
| 6,991,333 | B2 | 1/2006 | Van Atta et al. |
| 7,147,321 | B2 | 12/2006 | Van Atta |
| 7,192,134 | B2 * | 3/2007 | Teng .......................... 351/47 |
| 2002/0003603 | A1 * | 1/2002 | Bullard ..................... 351/118 |
| 2005/0179856 | A1 | 8/2005 | Van Atta et al. |

FOREIGN PATENT DOCUMENTS

| | | |
|---|---|---|
| IT | 01279337 | 12/1997 |
| IT | 01311533 | 3/2002 |
| IT | 02245516 | 3/2002 |
| WO | 9111159 | 8/1991 |
| WO | WO0036453 | 6/2000 |
| WO | WO2004088393 A1 * | 10/2004 |

OTHER PUBLICATIONS

International Search Report - PCT/US2007/066840.

* cited by examiner

EYEWEAR WITH INNER AND OUTER FRAME LENS

FIELD OF THE INVENTION

This invention relates generally to eyewear, and, in particular, to eyewear having an outer frame and lens and a removable inner frame and lens.

BACKGROUND OF THE INVENTION

Eyewear is well known for use in many activities including athletic activities, such as biking, skiing, and running. The eyewear may have a multitude of constructions. For example, the eyewear may have a wraparound lens secured to a frame, commonly referred to as a shield lens, or it may have two distinct lenses secured to a frame. Performance-type wraparound lenses are often worn by athletes and other users to provide blocking of the sun's rays and protection from wind, water spray, etc. However, user's with the need for prescription lenses typically cannot use such a lens without using contact lenses or sacrificing accurate vision.

It would be desirable to provide eyewear that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide eyewear with an outer frame and lens and an inner frame and lens removably secured to the outer frame, thereby allowing the user to wear prescription lenses and enjoy the benefits of protection from the sun, wind and other annoyances. In accordance with a first aspect, eyewear includes an outer frame having a right temple arm and a left temple arm. An outer lens is secured to the outer frame. An inner frame is removably secured to the outer frame. An inner lens is positioned in the inner frame. A portion of the outer lens engages the inner frame to removably secure the inner frame to the outer frame.

In accordance with another aspect, eyewear includes an outer frame having a right temple arm pivotally secured to the outer frame. A left temple arm is pivotally secured to the outer frame. A first groove and a second groove are formed in the outer frame. A left outer lens has a first tab, with the first tab being removably received in the first groove. A right outer lens has a second tab, with the second tab being removably received in the second groove. A first recess is formed in a rear surface of the outer frame and is in fluid communication with the first and second grooves. An inner frame is removably secured to the outer frame and has a projection extending forwardly from a front surface thereof. A first notch and a second notch are formed in the projection. An inner lens is positioned in the inner frame. The projection is received in the first recess in the outer frame, with a first portion of the outer lens being received in the first notch, and a second portion of the outer lens being received in the second notch.

In accordance with a further aspect, eyewear includes an outer frame having a first groove and a second groove formed therein, a right temple arm, and a left temple arm. A first recess is formed in a rear surface of the outer frame and is in fluid communication with the first groove and the second groove. A left outer lens has a first tab at an upper edge thereof. The first tab is removably received in the first groove. A right outer lens has a second tab at an upper edge thereof, with the second tab being removably received in the second groove. An inner frame has a projection extending forwardly from a front surface thereof, with the projection being received in the first recess in the outer frame. A prescription lens is positioned in the inner frame. A first notch and a second notch are formed in the projection. A first end of the first tab of the left outer lens is received in the first notch, and a first end of the second tab of the right outer lens is received in the second notch.

Substantial advantage is achieved by providing eyewear with an outer frame and an outer lens and an inner frame and an inner lens. In particular, certain embodiments allow a user to wear prescription lenses that are removably secured to an outer lens, thereby providing the user with the benefits of both clear and accurate vision and protection for the user's eyes from the sun and wind.

These and additional features and advantages disclosed here will be further understood from the following detailed disclosure of certain embodiments.

Figure 1:
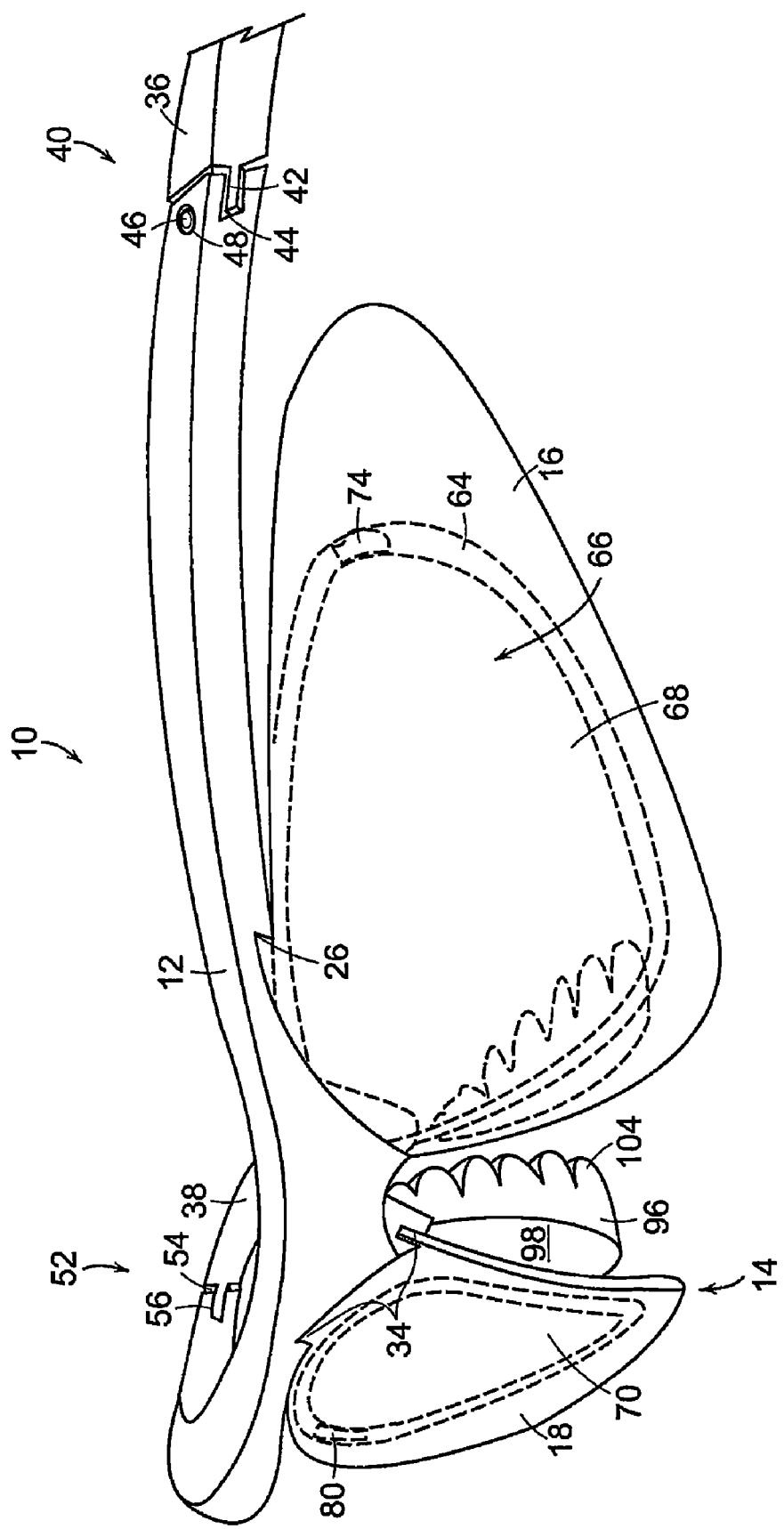
FIG. 1 is a front perspective view of an embodiment of eyewear with an outer lens and an inner lens.

The figures referred to above are not drawn necessarily to scale and should be understood to provide a representation of the invention, illustrative of the principles involved. Some features of the eyewear depicted in the drawings have been enlarged or distorted relative to others to facilitate explanation and understanding. The same reference numbers are used in the drawings for similar or identical components and features shown in various alternative embodiments. Eyewear with inner and outer frames and lenses as disclosed herein would have configurations and components determined, in part, by the intended application and environment in which they are used.

DETAILED DESCRIPTION OF CERTAIN PREFERRED EMBODIMENTS

Figure 2:
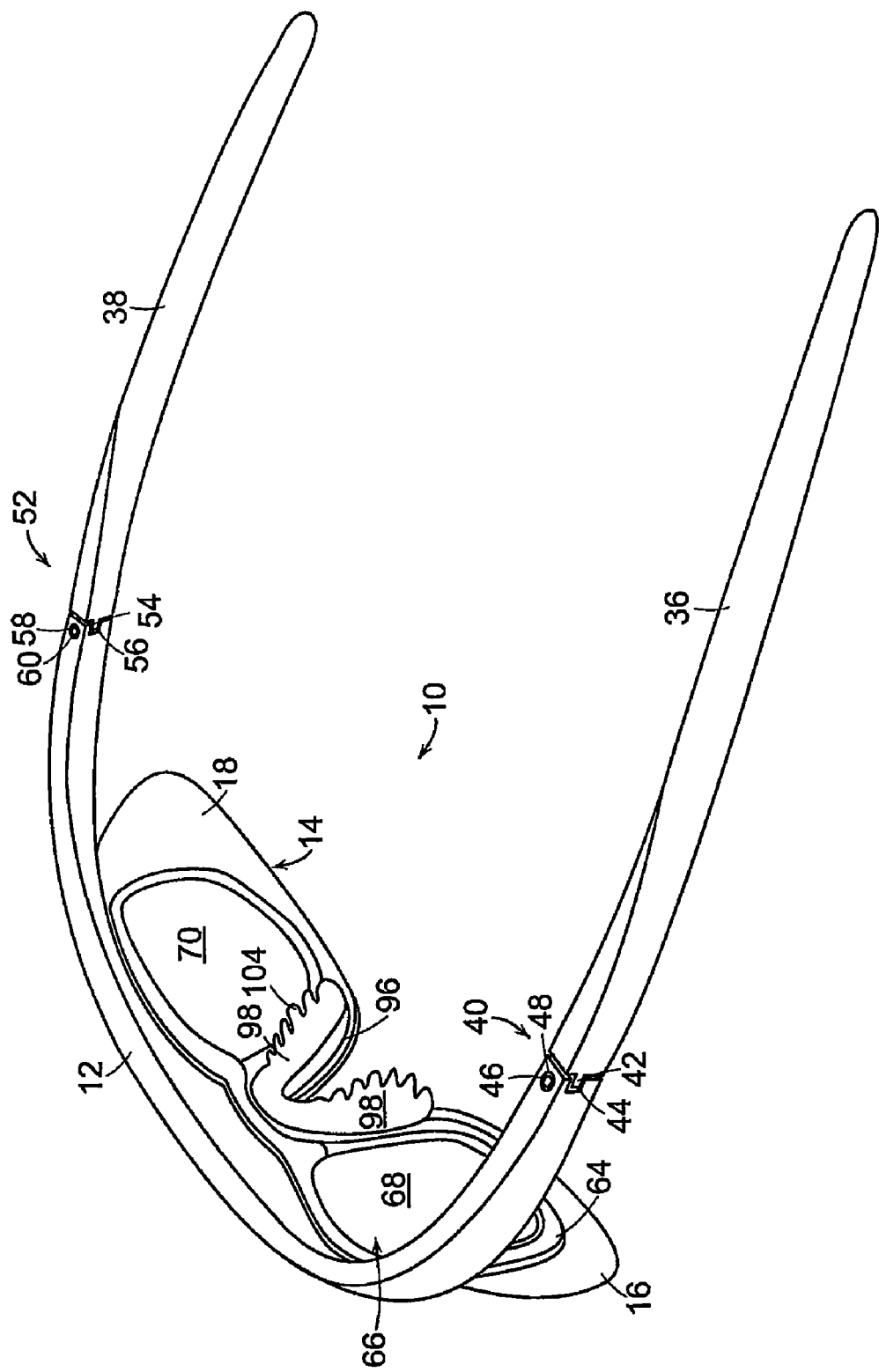
FIG. 2 is a rear perspective view of the eyewear of FIG. 1.
Figure 3:
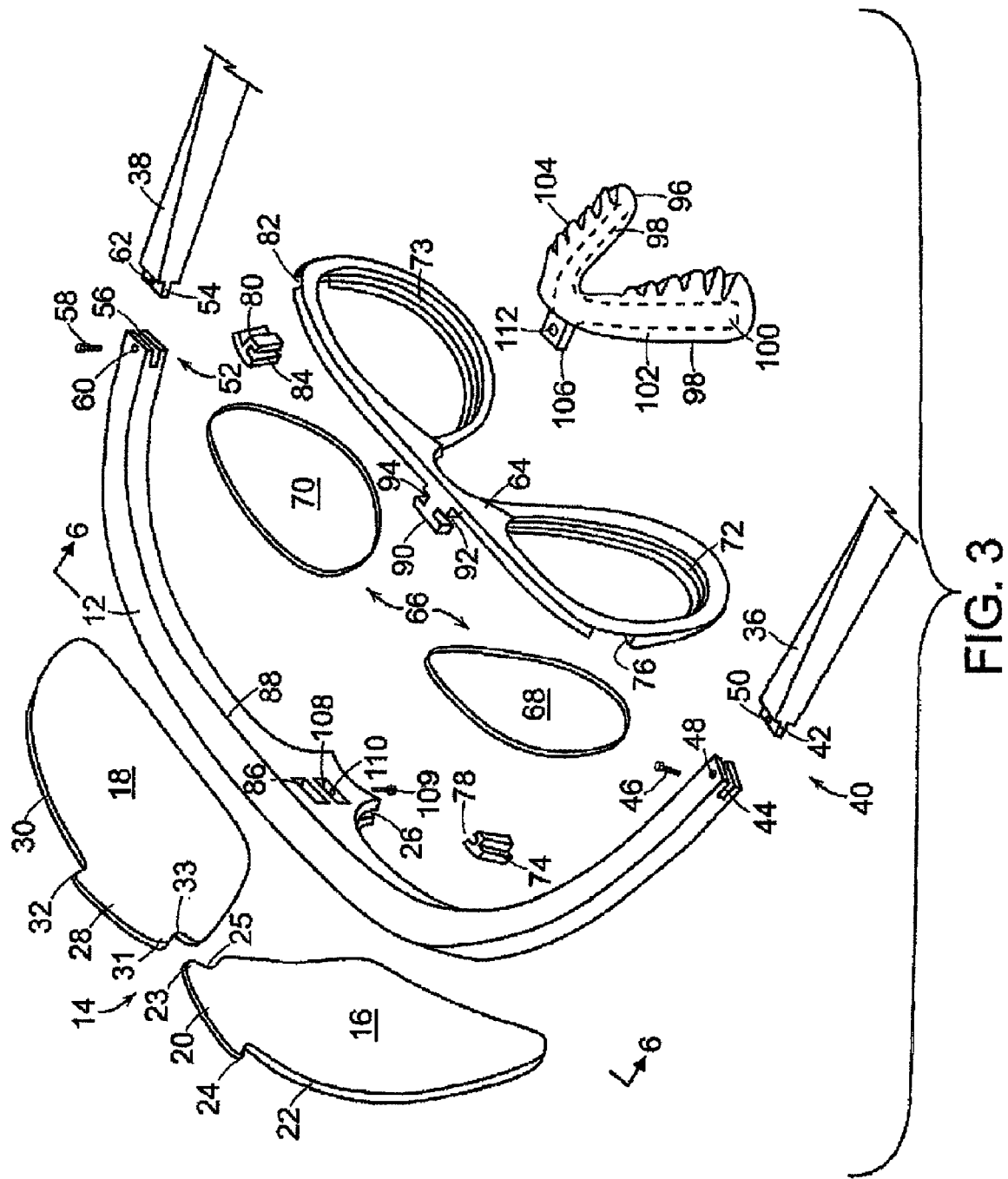
FIG. 3 is an exploded view of the eyewear of FIG. 1.
Figure 4:
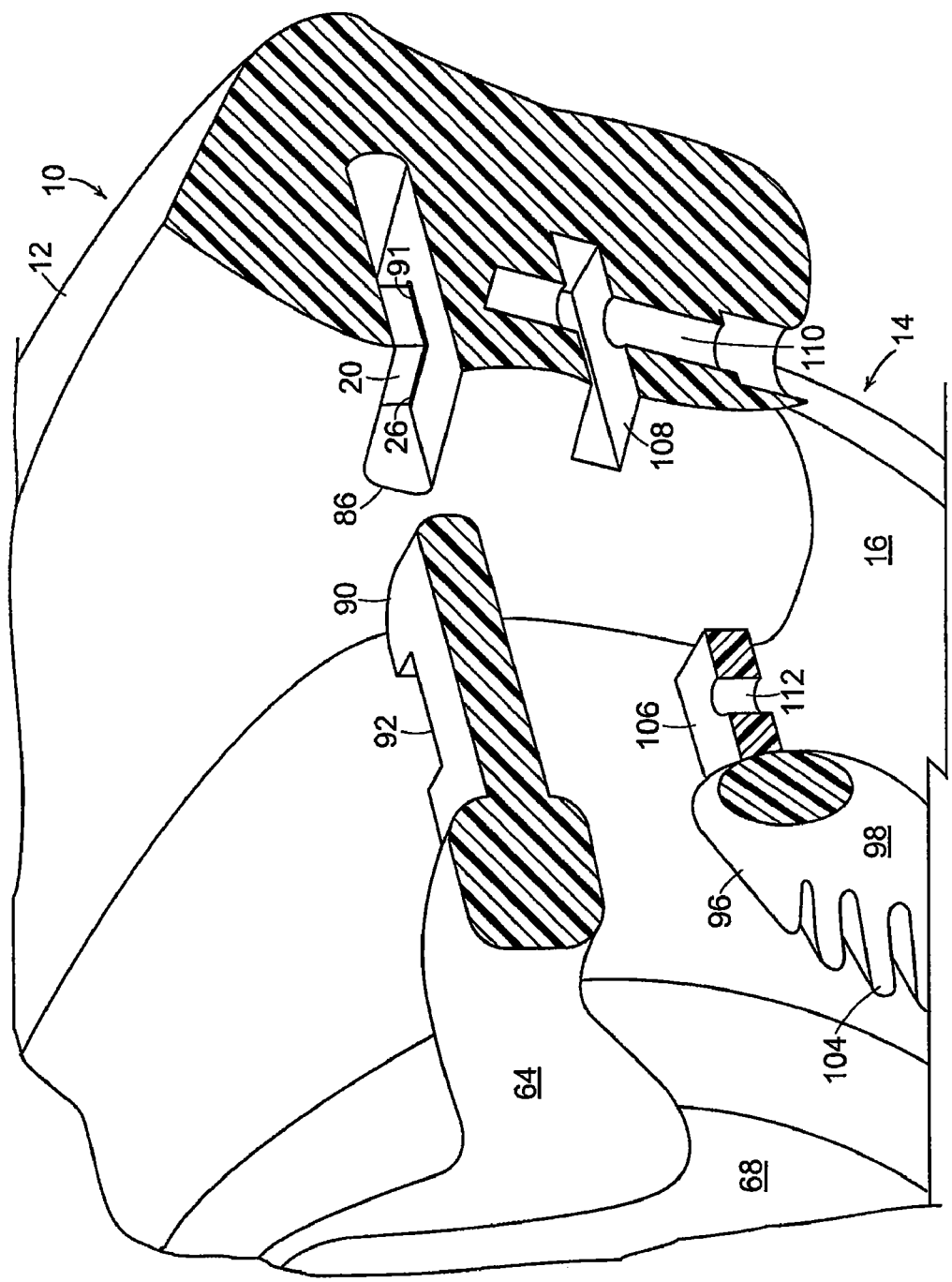
FIG. 4 is an enlarged exploded view, shown partially in section, of elements of the inner and outer lens of the eyewear of FIG. 1 prior to assembly.
Figure 5:
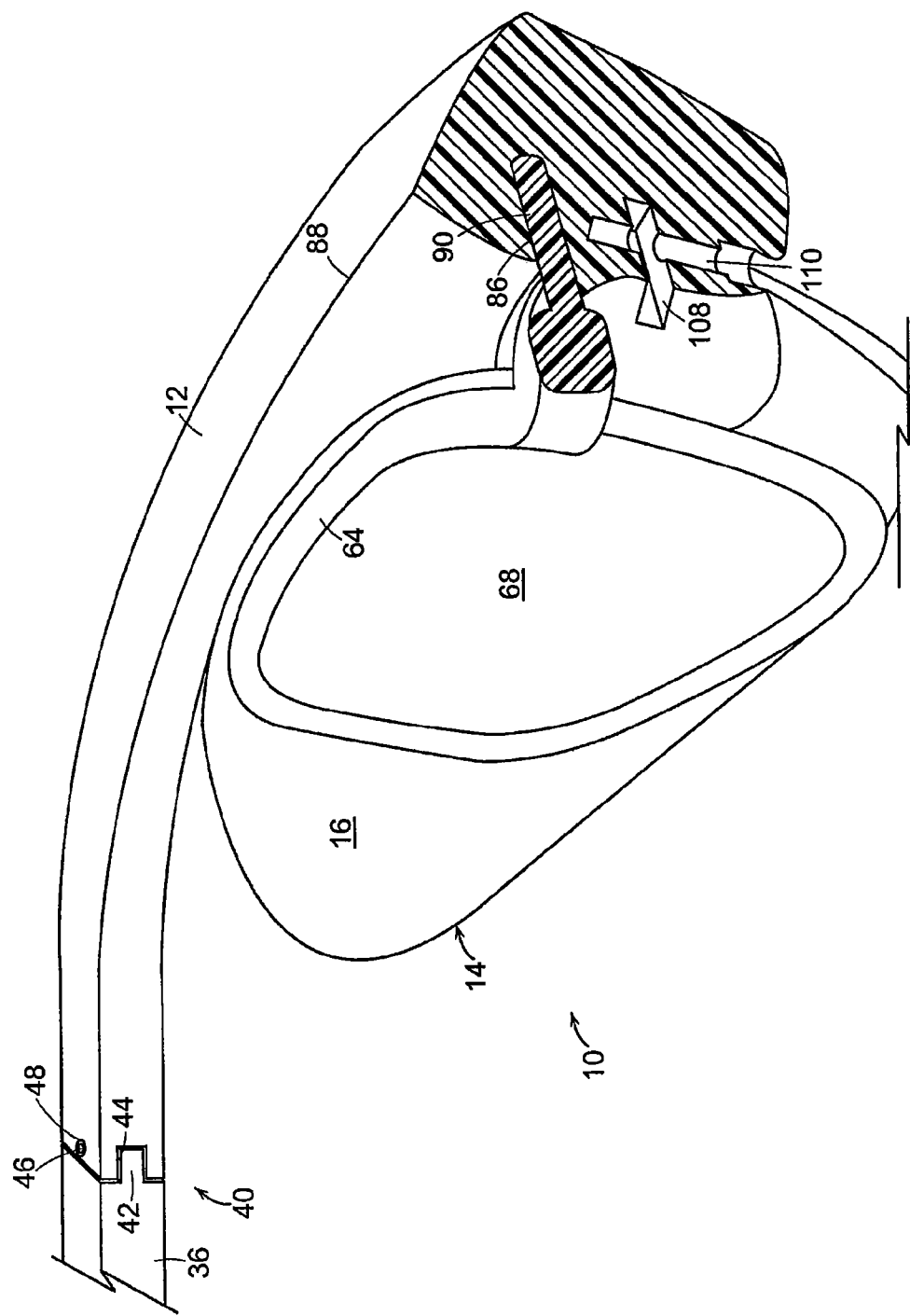
FIG. 5 is an enlarged perspective view, shown partially in section, of elements of the inner and outer lens of the eyewear of FIG. 1 in an assembled condition.

The present invention may be embodied in various forms. A preferred embodiment of eyewear 10 is shown in FIGS. 1-3. In particular, the embodiments depicted herein illustrate use of the present invention as performance sunglasses, often used by bicycle riders and runners, with an accompanying prescription lens. However, it is to be appreciated that eyewear 10 is meant to include not only performance sunglasses and prescription glasses, but rather, all types of glasses, including, for example, safety glasses.

Certain directional terms used herein refer to directions with respect to the wearer of eyewear 10. Thus, the terms outward, outwardly, forward, and forwardly, as used herein, refer to a surface facing away from, or a direction extending away from, or an element spaced from, the face of a wearer of eyewear 10. The terms inward, inwardly, rear, and rearwardly refer to a surface facing toward, or a direction extending toward, the face of a wearer of eyewear 10. The terms left and right are considered to be used with respect to the wearer of eyewear 10. Thus, for example, left of, or to the left, refers to a direction toward the wearer's left.

Eyewear 10 includes an outer frame 12 and a first or outer lens 14 secured to outer frame 12. Outer frame 12 may be formed of a rigid material, for example, a fiber-reinforced material such as a carbon fiber composite, providing a rigid structure and support for outer lens 14. In other embodiments, outer frame 12 may be formed of plastic, or a rubber-coated core material, such as metal or plastic. Other suitable materials for outer frame 12 will become readily apparent to those skilled in the art, given the benefit of this disclosure.

In certain embodiments, outer lens 14 is formed of a first or left outer lens 16 and a second or right outer lens 18. Left outer lens 16 and right outer lens 18 are removably secured to outer frame 12. A first tab 20 is formed on an interior end of an upper edge 22 of left outer lens 16, and has a first end 23 and a second end 24 positioned outwardly and to the left of first end 23. A first groove 25 is formed in left outer lens 16, below first end 23 of first tab 20. First end 23 and second end 24 of first tab 20 are captured within a first groove 26 formed in outer frame 12, seen more clearly in FIG. 6 and discussed in greater detail below. Left outer lens 16 can easily be pressed into snap-fit engagement within groove 26 of outer frame 12, as well as easily removed from outer frame 12 by the wearer. Thus, the user can very quickly and easily replace left outer lens 16 with an alternative or replacement lens.

Similarly, a second tab 28 is formed on an interior end of an upper edge 30 of right outer lens 18, having a first end 31 and a second end 32 positioned outwardly and to the right of first end 31. A second groove 33 is formed in right outer lens 18, below first end 31 of second tab 28. First end 31 and second end 32 of second tab 28 are captured within a second groove 34 formed in outer frame 12, seen more clearly in FIG. 6 and discussed in greater detail below. Right outer lens 18 can easily be pressed into snap-fit engagement within second groove 34 of outer frame 12, as well as being easily removed from outer frame 12. Thus, the user can also very quickly and easily replace right outer lens 18 with an alternative or replacement lens.

A first or left temple arm 36 is secured to outer frame 12. Similarly, a second or right temple arm 38 is secured to outer frame 12. In certain embodiments, left temple arm 36 and right temple arm 38 are pivotally secured to outer frame 12. In other embodiments, it is to be appreciated that left temple arm 36 and right temple arm 38 may be rigidly secured to outer frame 12, or they may be of unitary, that is, one-piece construction with outer frame 12.

Temple arms 36, 38 may be formed of any suitable material, including, for example, plastic, or a rubber coated core material, such as metal or plastic. In certain preferred embodiments, temple arms 36, 38 are formed of a flexible, resilient material, such as beta titanium. In other embodiments, temple arms 36, 38 may be formed of a rigid material, such as a fiber-reinforced material, e.g., a carbon fiber composite. Other suitable materials for temple arms 36, 38 will become readily apparent to those skilled in the art, given the benefit of this disclosure.

In the illustrated embodiment, a hinge 40 pivotally connects left temple arm 36 to outer frame 12. Hinge 40 includes a tab 42 that extends outwardly from left temple arm 36 and which is received in a slot or recess 44 formed in outer frame 12. A fastener such as a pin or screw 46 extends through an aperture 48 formed in outer frame 12 and an aperture 50 formed in tab 42, thereby pivotally securing tab 42 within recess 44. It is to be appreciated that alternatively a tab could be formed on outer frame 12 with a corresponding recess formed in left temple arm 36. Other suitable hinge mechanisms will become readily apparent to those skilled in the art, given the benefit of this disclosure.

Similarly, a hinge 52 pivotally connects right temple arm 38 to outer frame 12. Hinge 52 includes a tab 54 that extends outwardly from right temple arm 38 and which is received in a recess 56 formed in outer frame 12. A fastener such as a pin or screw 58 extends through an aperture 60 formed in outer frame 12 and an aperture 62 formed in tab 42, thereby pivotally securing tab 54 within recess 56. It is to be appreciated that fasteners 46, 58 may be bolts or rivets or any other suitable fastener that will adequately pivotally secure tabs 42, 54 to outer frame 12. It is to be appreciated that alternatively a tab could be formed on outer frame 12 with a corresponding recess formed in right temple arm 38. Other suitable hinge mechanisms will become readily apparent to those skilled in the art, given the benefit of this disclosure.

An inner frame 64 is positioned inwardly of outer lens 14. An inner lens 66 is secured within inner frame 64. In the illustrated embodiment, inner lens 66 is formed of a left inner lens 68 and a right inner lens 70. Left inner lens 68 may be captured within a left lens groove 72 and right inner lens 70 may be captured within a right lens groove 73, each being formed in inner frame 64, thereby allowing each of left and right inner lens 68, 70 to be easily removed and replaced. In certain embodiments, inner lens 66 is a prescription lens, allowing a user to enjoy the improved vision with their prescription lens while receiving the benefits of outer lens 14, e.g., sun and wind protection. Inner frame 64 may be formed of plastic, e.g., nylon, metal, or any other suitable material. Although inner lens 66 is depicted here as being formed of two lenses, it is to be appreciated that in certain embodiments, inner lens 66 could be a single lens.

A first bumper pad 74 is positioned in a first recess 76 formed in the left side of inner frame 64 proximate its upper edge. A lens groove 78 is formed in first bumper pad 74 and cooperates with left lens groove 72 of inner frame 64 to receive left inner lens 68. The engagement of left inner lens 68 with lens groove 78 captures first bumper pad 74 and retains it within first recess 76. It is to be appreciated that first bumper pad 74 could be secured to inner frame 64 with adhesive or other suitable fastening means.

A second bumper pad 80 is positioned in a second recess 82 formed in the right side of inner frame 64 proximate its upper edge. A lens groove 84 is formed in second bumper pad 80 and cooperates with lens groove 72 of inner frame 64 to receive right inner lens 70. The engagement of right inner lens 70 with right lens groove 73 of inner frame 64 and lens groove 84 of second bumper pad 80 captures second bumper pad 80 and retains it within second recess 82. It is to be appreciated that second bumper pad 80 could be secured to inner frame 64 with adhesive or other suitable fastening means.

First and second bumper pads 74, 80 serve to space inner lens 64 from the inner surface of outer lens 14, thereby minimizing the possibility of scratching or otherwise marring the surface of outer lens 14. Additionally, first and second bumper pads 74, 80 provide shock absorbing ability between outer frame 12 and inner frame 64, which is especially helpful when eyewear 10 is used in an activity in which the user encounters jarring vibrations, e.g., mountain biking.

First and second bumper pads 74, 80 may be formed, for example, of a resilient material such as rubber, any elastomer, silicone, or any soft durometer resin. Other suitable materials for first and second bumper pads 74, 80 will become readily apparent to those skilled in the art, given the benefit of this disclosure.

A first recess 86 is formed in a rear surface and proximate a top edge 88 of outer frame 12. First recess 86 is in fluid communication with first groove 26 and second groove 34. A projection 90 extends forwardly from a front surface of inner frame 64. Projection 90 is received in first recess 86 of outer frame 12. A first notch 92 is formed in a left side of projection 90 and a second notch 94 is formed in a right side of projection 90.

To secure inner frame 64 to outer frame 12, projection 90 of inner frame 64 is inserted into first recess 86. As noted above, first groove 26 and second groove 34 are in fluid communication with first recess 86, and first notch 92 is exposed to first groove 26 and second notch 94 is exposed to second groove 34. Left outer lens 16 and right outer lens 18 are then secured to outer frame 12, being received in first groove 26 and second groove 34, respectively. A portion of left outer lens 16 is received in first notch 92 and a portion of right outer lens 18 is received in second notch 94. The engagement of left outer lens 16 and right outer lens 18 within first and second notches 92, 94, respectively, serves to capture projection 90, thereby securing inner frame 64 to outer frame 12.

Figure 6:
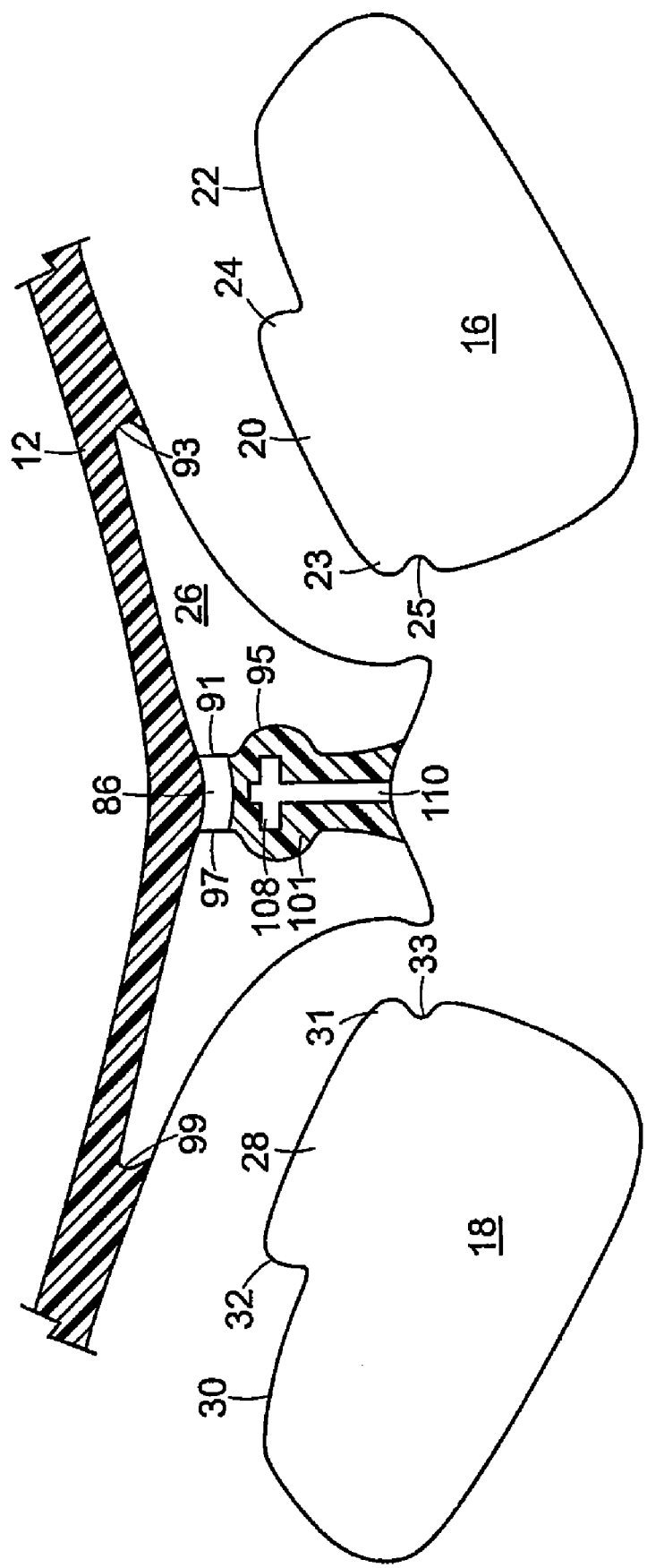
FIG. 6 is a section view, taken along line 6-6 of FIG. 3, of a portion of the outer frame of the eyewear of FIG. 1, and the outer lenses prior to insertion in the outer frame.

As seen in FIG. 6, first groove 26 has a first end 91 and a second end 93 positioned outwardly of first end 91. A first nub 95 is formed at first end 91 of first groove 26. First nub 95 engages first groove 25 of first outer lens 16 as described below. Similarly, second groove 34 has a first end 97 and a second end 99 positioned outwardly of first end 97. A second nub 101 is formed at first end 97 of second groove 34 and engages second groove 33 of second outer lens 18 as described below.

To insert left outer lens 16 to outer frame 12 in the illustrated embodiment, first end 23 of first tab 20 is initially inserted into first groove 26 just above first nub 95 such that first nub 95 is received by first groove 25 of first outer lens 16. When first end 23 of first tab 20 is inserted into first groove 26, it engages first notch 92 of inner frame 64. Left outer lens 16 is then twisted slightly upwardly such that second end 24 of first tab 20 fits into second end 93 of first groove 26 in snap-fit fashion.

Right outer lens 18 is installed in a similar manner, with first end 31 of second tab 28 initially being inserted into second groove 34 just above second nub 101 such that second nub 101 is received by second groove 33 of second outer lens 18, and first end 31 of second tab 18 engages second notch 94 of inner frame 64. Right outer lens 18 is then twisted slightly upwardly such that second end 32 fits into second end 99 of second groove 34 in snap-fit fashion. Thus, in this embodiment, first end 23 of first tab 20 of left outer lens 16 engages first notch 92 and first end 31 of second tab 28 of right outer lens 18 captures second notch 94.

A nosepiece 96 is secured to a rear surface of outer frame 12. Nosepiece 96 is an inverted V-shaped member having a pair of arms 98. Nosepiece 96 is formed of an inner portion 100 and an outer portion 102 encasing inner portion 100. In certain embodiments, inner portion 100 is moldable, allowing arms 98 to be moved to any desired position, thereby allowing the user to customize nosepiece 96 to comfortably sit on the bridge of their nose. Inner portion 100 may be formed of metal or any other suitable material.

A plurality of rearwardly extending fins 104 may be formed on a rear surface of nosepiece 96. Fins 104 rest on the bridge of the user's nose when eyewear 10 is worn by the user, and provide a positive gripping surface, reducing the chance of eyewear 10 slipping off the user's nose, and also provide additional ventilation. Outer portion 102 may be formed of rubber, which serves to provide good grip, plastic, or any other suitable material.

A projection 106 extends forwardly from nosepiece 96. In certain embodiments, projection 106 is of unitary construction with inner portion 100. Projection 106 is received in a second recess 108 formed in outer frame 12, just below first recess 86. A fastener such as a pin or screw 109 extends through an aperture 110 formed in outer frame 12 and an aperture 112 formed in projection 106, thereby securing nosepiece 96 to outer frame 12.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. Eyewear comprising, in combination:
   an outer frame having a right temple arm and a left temple arm;
   an outer lens secured to the outer frame;
   an inner frame removably secured to the outer frame; and
   an inner lens positioned in the inner frame;
   wherein a portion of the outer lens engages the inner frame to removably secure the inner frame to the outer frame.

2. The eyewear of claim 1, further comprising:
   a projection extending forwardly from a front surface of the inner frame and having a first notch and a second notch formed therein; and
   a first recess formed in a rear surface of the outer frame, the projection being received in the first recess in the outer frame, a first portion of the outer lens being received in the first notch, and a second portion of the outer lens being received in the second notch.

3. The eyewear of claim 2, further comprising:
   a nosepiece having a forwardly extending projection; and
   a second recess formed in the rear surface of the outer frame, the projection of the nosepiece being received in the second recess.

4. The eyewear of claim 3, further comprising:
   a first aperture in the outer frame;
   a second aperture formed in the projection of the nosepiece; and
   a fastener extending through the first aperture and the second aperture.

5. The eyewear of claim 3, wherein the nosepiece includes a plurality of rearwardly projecting fins.

6. The eyewear of claim 3, wherein the nosepiece comprises a first inner portion and a second outer portion substantially encasing the first inner portion.

7. The eyewear of claim 1, wherein the outer lens comprises a left outer lens and a right outer lens.

8. The eyewear of claim 7, further comprising:
   a first groove formed in the outer frame; and
   a second groove formed in the outer frame;
   a first recess formed in a rear surface of the outer frame;
   wherein the first recess in the outer frame is in fluid communication with the first groove and the second groove, a portion of the left outer lens is received in the first groove, and a portion of the right outer lens is received in the second groove.

9. The eyewear of claim 8, wherein the left outer lens includes a first tab at an upper edge thereof, the first tab of the left outer lens being received in the first groove, and the right outer lens includes a second tab at an upper edge thereof, the second tab of the right outer lens being received in the second groove.

10. The eyewear of claim 9, further comprising:
a projection extending forwardly from a front surface of the inner frame and having a first notch and a second notch formed therein;
wherein the projection is received in the first recess in the outer frame, a portion of the first tab of the left outer lens is received in the first notch, and a portion of the second tab of the right outer lens is received in the second notch.

11. The eyewear of claim 1, wherein the inner lens comprises a left inner lens and a right inner lens.

12. The eyewear of claim 11, further comprising:
a left lens groove formed in the inner frame; and
a right lens groove formed in the inner frame;
wherein the left inner lens is received in the left lens groove and the right inner lens is received in the right lens groove.

13. The eyewear of claim 1, further comprising:
a first bumper pad positioned between the inner frame and the outer lens; and
a second bumper pad positioned between the inner frame and the outer lens.

14. The eyewear of claim 13, wherein the first and second bumper pads are secured to the inner frame by engagement of the inner lens and the inner frame.

15. The eyewear of claim 13, wherein each of the first and second bumper pads includes a lens groove configured to receive a portion of the inner lens.

16. The eyewear of claim 1, wherein the inner lens is a prescription lens.

17. The eyewear of claim 1, wherein the left temple arm and right temple arm are pivotally secured to the outer frame.

18. Eyewear comprising, in combination:
an outer frame having a right temple arm pivotally secured to the outer frame, a left temple arm pivotally secured to the outer frame, a first groove formed therein, and a second groove formed therein;
a left outer lens having a first tab, a portion of the first tab being removably received in the first groove;
a right outer lens having a second tab, a portion of the second tab being removably received in the second groove;
a first recess formed in a rear surface of the outer frame and in fluid communication with the first and second grooves;
an inner frame removably secured to the outer frame and having a projection extending forwardly from a front surface thereof, and having a first notch and a second notch formed therein;
an inner lens positioned in the inner frame; and
the projection being received in the first recess in the outer frame, a first portion of the outer lens being received in the first notch, and a second portion of the outer lens being received in the second notch.

19. The eyewear of claim 18, wherein a first end of the first tab of the left outer lens is received in the first notch, and a first end of the second tab of the right outer lens is received in the second notch.

20. The eyewear of claim 18, further comprising:
a nosepiece having a forwardly extending projection; and
a second recess formed in the rear surface of the outer frame, the projection of the nosepiece being received in the second recess.

21. The eyewear of claim 18, wherein the inner lens comprises a left inner lens and a right inner lens.

22. The eyewear of claim 21, further comprising:
a left lens groove formed in the inner frame; and
a right lens groove formed in the inner frame;
wherein the left inner lens is received in the left lens groove and the right inner lens is received in the right lens groove.

23. The eyewear of claim 18, further comprising:
a first bumper pad positioned between the inner frame and the outer lens; and
a second bumper pad positioned between the inner frame and the outer lens.

24. The eyewear of claim 23, wherein the first and second bumper pads are secured to the inner frame by engagement of the inner lens and the inner frame.

25. The eyewear of claim 23, wherein each of the first and second bumper pads includes a lens groove configured to receive a portion of the inner lens.

26. Eyewear comprising, in combination:
an outer frame having a first groove formed therein, a second groove formed therein, a right temple arm, a left temple arm, and a first recess formed in a rear surface thereof and in fluid communication with the first groove and the second groove;
a left outer lens having a first tab at an upper edge thereof, the first tab being removably received in the first groove;
a right outer lens having a second tab at an upper edge thereof, the second tab being removably received in the second groove;
an inner frame having a projection extending forwardly from a front surface thereof, the projection being received in the first recess in the outer frame;
a prescription lens positioned in the inner frame;
a first notch formed in the projection;
a second notch formed in the projection,
wherein a first end of the first tab of the left outer lens is received in the first notch, and a first end of the second tab of the right outer lens is received in the second notch.

* * * * *